(12) United States Patent
Smidt

(10) Patent No.: US 7,362,082 B2
(45) Date of Patent: Apr. 22, 2008

(54) SWITCH MODE POWER SUPPLY WITH OUTPUT VOLTAGE EQUALIZER

(75) Inventor: Pieter Jan Mark Smidt, Eindhoven (NL)

(73) Assignee: Bobinados de Transformadores S.L., Muel, Zaraboza (ES)

( * ) Notice: Subject to any disclaimer, the term of this patent is extended or adjusted under 35 U.S.C. 154(b) by 0 days.

(21) Appl. No.: 10/598,634

(22) PCT Filed: Mar. 3, 2005

(86) PCT No.: PCT/IB2005/050792

§ 371 (c)(1),
(2), (4) Date: Sep. 7, 2006

(87) PCT Pub. No.: WO2005/091497

PCT Pub. Date: Sep. 29, 2005

(65) Prior Publication Data

US 2007/0146940 A1 Jun. 28, 2007

(30) Foreign Application Priority Data

Mar. 12, 2004 (EP) .................................. 04101014

(51) Int. Cl.
*G05F 1/618* (2006.01)
*G05F 1/575* (2006.01)

(52) U.S. Cl. .................. 323/284; 323/285; 330/207 A; 330/251

(58) Field of Classification Search ............ 330/207 A, 330/251; 323/282, 284, 285
See application file for complete search history.

(56) References Cited

U.S. PATENT DOCUMENTS

| | | | | |
|---|---|---|---|---|
| 4,488,438 A | * | 12/1984 | Tomita | .................... 73/861.12 |
| 5,559,467 A | * | 9/1996 | Smedley | ...................... 330/10 |
| 6,344,811 B1 | * | 2/2002 | Melanson | .................... 341/143 |
| 6,943,620 B2 | * | 9/2005 | Andersen et al. | ............. 330/10 |

* cited by examiner

*Primary Examiner*—Gary L. Laxton
(74) *Attorney, Agent, or Firm*—Gregory L. Thorne

(57) ABSTRACT

A switch mode power supply for feeding a single ended class D amplifier, having. two voltage sources (1, 2) is disclosed. The power supply comprises a voltage equalizer circuit including a coil (10) having a first terminal connected to said common point (3), a first switch (11) connected between a second terminal of the coil (10) and the positive side of the first source (1), a second switch (12) connected between said second terminal of the coil (1) and the negative side of the second source (2), and control circuitry (13, 14) for determining when the voltage (v 1, v2) of one of the voltage sources (1 or 2) exceeds a predetermined threshold value (vthresh,ON), and, in response to such a determination, periodically operate the switch (11 or 12) associated with said one voltage source ON and OFF, thereby redistributing energy from said one voltage source (1 or 2) to the other voltage source (2 or 1). The inventive voltage equalizer thus acts as a switch mode converter, redistributing energy from one voltage source to the other, thereby ensuring that the output voltages of both sources are essentially equal. Further, the voltage equalizer requires very few components, and is thus simple to implement. As the two switches only need to handle the excess of power they can be relatively small and cost efficient.

8 Claims, 2 Drawing Sheets

SWITCH MODE POWER SUPPLY WITH OUTPUT VOLTAGE EQUALIZER

The present invention relates to a switch mode power supply with two (inverted) voltage sources. Such power supplies are normally used for driving class D amplifiers. The invention also relates to a class D amplifier driven by such a power supply.

A half bridge based (so called single ended) Class D amplifier requires a power supply having two inverted voltage sources, and normally a switch mode power supply is used. When such a power supply is connected to a class D amplifier, a phenomenon called the "pump effect" arises, meaning that for low audio frequencies, the class D amplifier transfers energy from one of the voltage sources to the other. This effect can be quite substantial, leading to impaired performance of the amplifier and can even lead to destruction of the ICs in the Class D amplifier.

In order to overcome this problem, the capacitance value of the output capacitors can be set very large, thereby reducing the ripple to an acceptable value compared to the output voltage. However, the output capacitors, which typically are electrolytic capacitors, then become very large and expensive.

Alternatively, a dissipative power clamp can be arranged on each voltage source, thereby dissipating any excess of power that is transferred to the voltage source. The drawback is of course that this leads to reduced efficiency, thermal problems and additional bulky components.

It is an object of the present invention to overcome this problem, and to provide output voltage equalizing of a switch mode power supply.

According to the invention, this and other objects are achieved with a switch mode power supply comprising two voltage sources, the negative side of the first source being connected to the positive side of the second source in a common point, and further comprising a voltage equalizer circuit including a coil having a first terminal connected to the common point, a first switch connected between a second terminal of the coil and the positive side of the first source, a second switch connected between said second terminal of the coil and the negative side of the second source, and control circuitry for determining when the voltage of one of the voltage sources exceeds a predetermined threshold value, and, in response to such a determination, periodically operate the switch associated with said one voltage source ON and OFF, thereby redistributing energy from said one voltage source to the other voltage source.

The inventive voltage equalizer thus acts as a switch mode converter, redistributing energy from one voltage source to the other, thereby ensuring that the output voltages of both sources are essentially equal. Further, the voltage equalizer requires very few components, and is thus simple to implement. As the two switches only need to handle the excess of power they can be relatively small and cost efficient.

According to a preferred embodiment, the control circuitry comprises one control circuit for each switch, each circuit including a comparator connected in parallel with the corresponding voltage source for generating an activation signal for as long as the source output voltage exceeds the threshold value, and an oscillator connected to the gate of the switch and receiving said activation signal, for providing a periodic gate signal when said activation signal is present.

This design of the required control circuitry is very simple, further improving the cost efficiency of the inventive voltage equalizer.

The comparator is preferably a hysteresis comparator, adapted to inhibit the activation signal when the source output voltage falls below a second threshold value. By having different thresholds for activating and deactivating the periodic switching of the equalizer, a more stable process is achieved.

The switches are preferably MOSFET switches. An advantage with these switches is that they inherently provide a rectifying effect by means of the parasitic body diode of the MOSFET's, making an additional rectifying diode superfluous.

The switch mode power supply is advantageously used to drive a class D amplifier.

This and other aspects of the present invention will now be described in more detail, with reference to the appended drawings showing a currently preferred embodiment of the invention.

Figure 1:
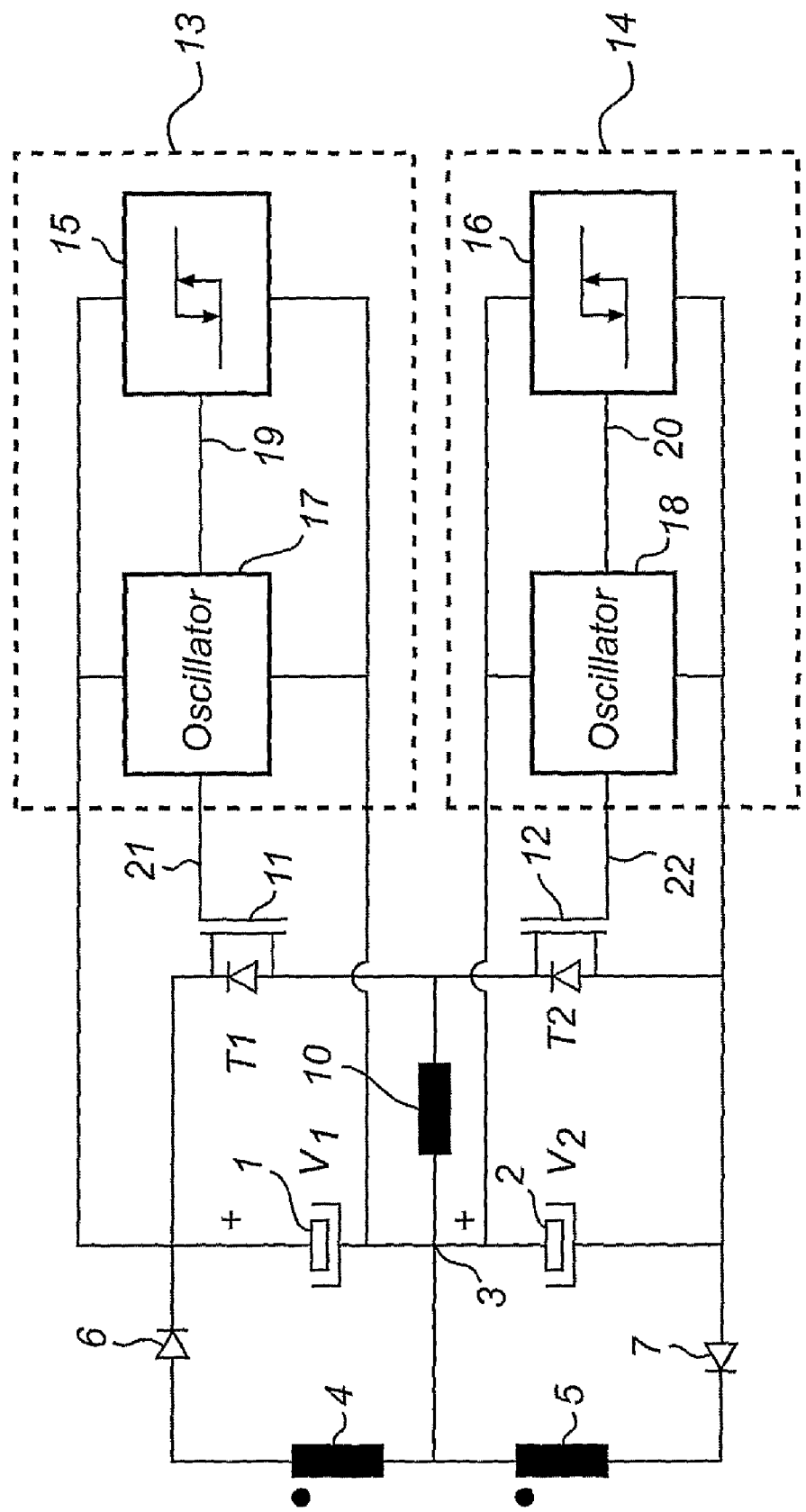
FIG. 1 is a schematic circuit diagram of a switch mode power supply according to the invention.

The power supply in FIG. 1 has two inverted power sources in the form of two electrolytic capacitors (elcaps) 1, 2 connected in series, with the negative side of the upper elcap 1 and the positive side of the lower elcap 2 connected to a common point 3. In parallel to each source is connected a circuit comprising one side of a transformer winding 4, 5 and a diode 6, 7 in series, such that the two transformed windings 4 and 5 are connected to each other in the common point 3. In use, the transformer windings 4 and 5 will transfer energy via diodes 6 and 7 to a load, e.g. a class D amplifier (not shown). As an example, the output voltages of the voltage sources 1 and 2 can be +/−27 V.

According to the invention, the power supply in FIG. 1 is further provided with a coil 10, connected between the common point 3 and the first terminals of two switches 11 and 12, the second terminals of which are connected to the other sides of the elcaps 1 and 2. Each of the voltage sources 1, 2 is thus connected in parallel with a circuit comprising a switch 11, 12 and the coil 10 in series.

The switches 11, 12 can be transistor switches such as MOSFETs. The upper switch 11 is preferably a p-channel MOSFET, with its drain connected to the coil 10 and its source connected to the positive side of the upper voltage source 1, while the lower switch 12 is preferably a n-channel MOSFET, with its source connected to the coil 3 and its drain connected to the negative side of the lower voltage source 2. With such a design, the drive of the MOSFETs is simplified (no floating drive is required).

Each switch 11, 12 is controlled by a control circuit 13 and 14, respectively, in the illustrated example each comprising a comparator 15, 16 and an oscillator 17, 18. The comparator 15, 16 of each control circuit is connected in parallel with its respective voltage source 1, 2, and has an output signal, referred to as an activation signal 19, 20, connected to the oscillator 17, 18. The oscillator, which is voltage supplied by the voltage source 1, 2, has its output 21, 22 connected to the gate of the respective switch 11, 12. The comparators are preferably of hysteresis type, with a given reference voltage and a given hysteresis. In the given example, the reference voltage can be 29 V, with a hysteresis of 1 V.

Figure 2A:
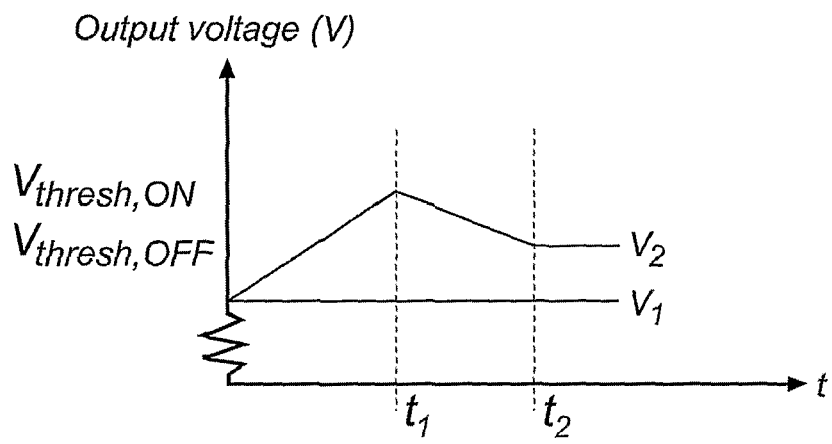
FIG. 2a is a diagram showing the output voltages of the power sources in FIG. 1.
Figure 2B:
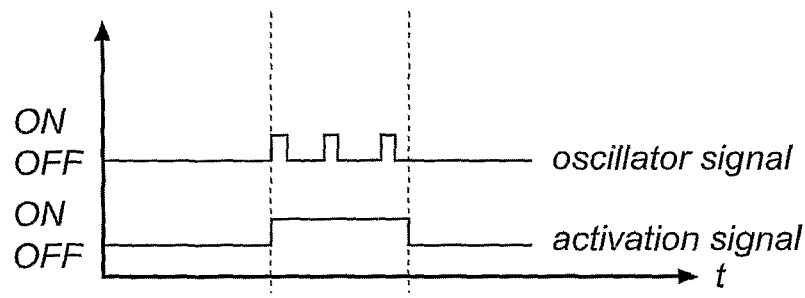
FIG. 2b is a diagram showing the activation signal from the comparator and the gate signal generated by the oscillator in one of the control circuits in FIG. 1.
Figure 2C:
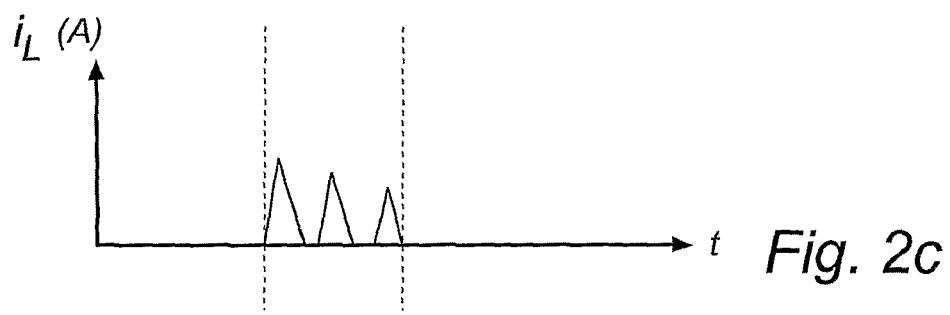
FIG. 2c is a diagram showing the current through the coil in FIG. 1.

The function of the circuit in FIG. 1 will now be described with reference to FIG. 2a-c. In FIG. 2a, the voltages of the two elcaps are shown, at a point $t_1$ in time, the output voltage $v_2$ of the lower elcap exceeds the output voltage $v_1$ of the upper elcap more than a predetermined threshold value, $v_{thresh,ON}$, in the example given above at 29 V. This is detected by the comparator in the lower control circuit, which generates an activation signal to the oscillator. The oscillation signal is shown in FIG. 2b.

Each time the oscillation signal is high, the lower MOSFET is switched ON, and the coil is connected over the lower elcap. As shown in FIG. 2c, the current (and thus the flux) in the coil increases with time at a rate equal to $v_2/L$, thereby transferring energy from the elcap to the coil. When the MOSFET is switched OFF, a current will instead flow through the upper MOSFET's body diode and the upper elcap, thus delivering energy to the upper elcap. As shown in FIG. 2c, the current in the coil will now decrease at a rate $v_1/L$. As the rate of decrease is lower than the rate of increase (as the voltage $v_1$ in this case is lower than $v_2$), it can be advantageous to have the ON-period of the oscillation signal be slightly shorter than the OFF-period, in order to allow for the coil flux to fully be transferred to the upper elcap before the next oscillation starts (discontinuous mode). If the ON- and OFF-periods are equal in length (continuous mode), this may lead to an accumulation of flux, in which case the ferrite core of the coil may saturate. Continuous mode may be advantageous for applications with low voltages and high currents.

Through repeated switching of the lower MOSFET, energy is transferred from the lower elcap to the upper, until, at a point $t_2$ in time, the lower output voltage $v_2$ has fallen under a predetermined value, $v_{thresh,OFF}$, in the example given above at 28 V. With a switching frequency of around 100 kHz, and a coil inductance of around 50 μH, it will require around 500-1000 switching cycles to reduce the output voltage difference by 1 V.

Energy transfer from the upper elcap to the lower is performed in exactly the same way.

The person skilled in the art realizes that the present invention by no means is limited to the preferred embodiments described above. On the contrary, many modifications and variations are possible within the scope of the appended claims. For example, the simplified circuit in FIG. 1 may in reality comprise additional components, that have been omitted for sake of clarity.

The invention claimed is:

1. A switch mode power supply for feeding a single ended class D amplifier, said power supply comprising two voltage sources (1, 2), the negative side of the first source (1) being connected to the positive side of the second source (2) in a common point (3), characterized by a voltage equalizer circuit including
   a coil (10) having a first terminal connected to said common point (3),
   a first switch (11) connected between a second terminal of the coil (10) and the positive side of the first source (1),
   a second switch (12) connected between said second terminal of the coil (1) and the negative side of the second source (2), and
   control circuitry (13, 14) for determining when the voltage ($v_1$, $v_2$) of one of the voltage sources (1 or 2) exceeds a first threshold value ($v_{thresh,ON}$), and, in response to such a determination, periodically operate the switch (11 or 12) associated with said one voltage source ON and OFF, thereby redistributing energy from said one voltage source (1 or 2) to the other voltage source (2 or 1).

2. A switch mode power supply according to claim 1, wherein the control circuitry comprises one control circuit (13, 14) for each switch (11, 12), each circuit including
   a comparator (15, 16) connected in parallel with the corresponding voltage source (1, 2) for generating an activation signal (19, 20) while the source output voltage (v1, v2) exceeds said first threshold value ($v_{thresh,ON}$), and
   an oscillator (17, 18) connected to the gate of the switch (11, 12) and receiving said activation signal (19, 20), for providing a periodic gate signal (21, 22) when said activation signal (19, 20) is present.

3. A switch mode power supply according to claim 2, wherein the comparator further is a hysteresis comparator, adapted to inhibit the activation signal when the source output voltage ($v_1$, $v_2$) falls below a second threshold value ($v_{thresh,OFF}$).

4. A switch mode power supply according to clam 3, wherein said first threshold value ($V_{thresh,ON}$) is greater than said second threshold value ($v_{thresh,OFF}$).

5. A switch mode power supply according to claim 3, wherein said first and second threshold values ($V_{thresh,ON}$, $V_{thresh,OFF}$) are greater than the desired source output voltage.

6. A switch mode power supply according to claim 1, wherein said switches are MOSFET switches (11, 12).

7. A switch mode power supply according to claim 1, wherein said voltage. sources are electrolytic capacitors (1, 2).

8. A class D amplifier fed by a switch mode power supply according to claim 1.

* * * * *